(12) United States Patent
Kim et al.

(10) Patent No.: US 8,687,453 B2
(45) Date of Patent: Apr. 1, 2014

(54) ENERGY EFFICIENT PROCESSOR HAVING HETEROGENEOUS CACHE

(75) Inventors: Nam Sung Kim, Madison, WI (US); Stark C. Draper, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 148 days.

(21) Appl. No.: 13/271,771

(22) Filed: Oct. 12, 2011

(65) Prior Publication Data

US 2013/0094318 A1     Apr. 18, 2013

(51) Int. Cl.
 *G11C 5/14* (2006.01)
(52) U.S. Cl.
 USPC .......................... 365/227; 365/200; 365/228
(58) Field of Classification Search
 USPC ............ 365/227, 189.17, 189.2, 189.08, 228; 711/118, 113, 122, 119, 129
 See application file for complete search history.

(56) References Cited

U.S. PATENT DOCUMENTS

| | | | | |
|---|---|---|---|---|
| 6,434,668 B1* | 8/2002 | Arimilli et al. | ............... | 711/128 |
| 7,136,984 B2* | 11/2006 | Maiyuran et al. | ............. | 711/173 |
| 7,606,976 B2* | 10/2009 | Raghuvanshi | ................ | 711/118 |
| 2005/0080994 A1* | 4/2005 | Cohen et al. | .................. | 711/118 |
| 2006/0136656 A1* | 6/2006 | Conley et al. | ................. | 711/103 |
| 2008/0040547 A1* | 2/2008 | Abadeer et al. | ............... | 711/128 |
| 2009/0138658 A1* | 5/2009 | Dreslinski et al. | ............ | 711/118 |
| 2010/0191990 A1* | 7/2010 | Zhang et al. | ................. | 713/320 |

* cited by examiner

*Primary Examiner* — Son Dinh
*Assistant Examiner* — Uyen B Tran
(74) *Attorney, Agent, or Firm* — Boyle Fredrickson, S.C.

(57) ABSTRACT

A heterogeneous cache structure provides several memory cells into different ways each associated with different minimum voltages below which the memory cells produce substantial state errors. Reduced voltage operation of the cache may be accompanied by deactivating different ways according to the voltage reduction. The differentiation between the memory cells in the ways may be implemented by devoting different amounts of integrated circuit area to each memory cell either by changing the size of the transistors comprising the memory cell or devoting additional transistors to each memory cell in the form of shared error correcting codes or backup memory cells.

20 Claims, 6 Drawing Sheets

ENERGY EFFICIENT PROCESSOR HAVING HETEROGENEOUS CACHE

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to architectures for integrated circuits and in particular to an improved method and apparatus providing reliable and power conserving, low-voltage operation of the cache structures.

Current computer architectures employ a set of intermediate memories (cache memories) between the processor and a main solid-state memory. A cache memory provides high-speed local storage for the processor that may help overcome the relatively slower access speeds available between the processor and the main solid-state memory. Successful operation of the cache memory takes advantage of the ability to predict likely future use of data by the processor so that data required by the processor may be pre-stored or retained in the cache memory to be quickly available when that data is needed.

Often multiple hierarchical cache memories are be used with the smallest and fastest cache (L1) operating in coordination with successively larger and slower caches (L2, L3) the largest of which is designated the "last-level cache" (LLC). Multiple levels of cache memories allow a flexible trade-off between speed of data access and the likelihood that the requested data will be in the cache memory (a cache hit). Caches are normally managed by a cache controller, which determines which portions of the cache "lines" should be ejected when new data is required in response to a cache miss, for example, and which keeps track of "dirty" cache lines in which the processor has written data to the cache, which must be reflected back into the main computer memory.

With increased circuit density in integrated circuits, power efficiency has become a design priority for high-performance and low-power processors. The maximum speed of high-performance processors is often limited by problems of power dissipation which may be addressed by improving energy efficiency. For low-power processors, energy efficiency increases the operating time of the processor when operating on battery power source.

An effective technique to increase processor efficiency is dynamic voltage and frequency scaling (DVFS) in which the processor voltage and processor clock speed are reduced at times of low processing demand. Reducing the processor voltage and frequency significantly lowers dynamic and static power consumption of transistors.

The minimum voltage ($V_{DDMIN}$) that may be used with DVFS for cache memories is determined by the lowest voltage at which the transistor circuitry of the memory cells of the cache may maintain their logical state. $V_{DDMIN}$ may be reduced by increasing the size of the transistors in the SRAM cells of the cache memories. This makes the transistors less sensitive to mismatches induced by process variations such as random dopant fluctuations (RDF) and line edge roughness (LER) limits. Increasing the size of these transistors, however, is undesirable because cache memories currently occupy more than 50 percent of the total area for many processor systems.

SUMMARY OF THE INVENTION

The present invention provides a heterogeneous cache structure in which the cache is divided into predefined portions that may be ranked according to their ability to operate reliably at low voltages. As a voltage on the cache is reduced, different portions of the cache are deactivated according to this ranking, effectively reducing the capacity of the cache while allowing the remaining portions of the cache to remain operable. The decrease in processor performance caused by this reduction in cache capacity at low voltage is strongly mitigated by the reduced performance penalty of accessing main computer memory in a cache miss at concomitant low clock speeds.

Specifically, the invention provides a cache system comprising a series of addressable transistor memory cells holding digital data when powered by an operating voltage. The addressable transistor memory cells are grouped into at least two portions that may be independently deactivated wherein the portions provide different architectures having different predetermined susceptibility to errors as a function of operating voltage. Individual portions of the cache system may be deactivated or activated with changes in operating voltage according to the predetermined susceptibility to errors as a function of operating voltage.

It is thus a feature of at least one embodiment of the invention to vary the architecture of the cache to allow lower voltage operation of at least a portion of the cache and thereby rendering a flexible trade-off between cache area and the ability to conserve power.

The addressable transistor memory cells may be grouped into at least three portions that may be independently deactivated It is thus a feature of at least one embodiment of the invention to permit a flexible trade-off between performance and power conservation through multiple levels of voltage reduction and cache capacity reduction.

The transistor memory cells of the different portions may differ according to area of the integrated circuit associated with transistors of each memory cell, with the portions having a greater area being less susceptible to errors as operating voltage decreases than memory portions having lesser area.

It is thus a feature of at least one embodiment of the invention to provide the variation in cache architecture by varying the amount of circuit area devoted to each memory cell. Generally, the extra area required for some memory cells may be may be more than offset by the ability to make area devoted to other memory cells smaller, which is possible because those latter memory cells need not operate at homogeneously low voltages.

Corresponding individual transistors of the memory cells of different portions may have different sizes of transistor area.

It is thus a feature of at least one embodiment of the invention to provide a simple method of varying the architecture by scaling the size of the memory cells among the different portions.

Alternatively, the memory cells of different portions may be associated with different numbers of transistors implementing error correcting codes of different lengths.

It is thus a feature of at least one embodiment of the invention to permit variation in the architecture by changing the association of memory cells in different portions with different amounts of error correction circuitry.

Alternatively, the memory cells of different portions may be associated with different numbers of spare memory cells that may be substituted for the memory cells of the portion.

It is thus a feature of at least one embodiment of the invention to control the susceptibility of the memory cells to low-voltage failure through the ability to select among different memory cells for low-voltage properties.

The memory cells may be static random access memory cells.

It is thus a feature of at least one embodiment of the invention to provide a system that works with the most common cache memory architecture.

The cache may work with a cache controller that operates to identify dirty cache lines in groups of memory cells to be deactivated and to move data of these cache lines into main memory.

It is thus a feature of at least one embodiment of the invention to preserve processor operating state after changes in cache capacity.

The cache controller may further operate to identify dirty cache lines in groups of memory cells to be deactivated and to move the data of these cache lines into clean cache lines of groups of memory cells.

It is thus a feature of at least one embodiment of the invention to significantly reduce the overhead of preserving data from cache portions that will be shut down by performing an intra-cache transfer instead of a write back to main memory.

The cache controller may move the data of the cache lines into the clean cache lines of a group of memory cells that have been least recently accessed.

It is thus a feature of at least one embodiment of the invention to decrease the likelihood of displacing useful cache data during the intra-cache transfer. Generally, the least recently accessed cache portions have the least value for future cache access.

These particular features and advantages may apply to only some embodiments falling within the claims and thus do not define the scope of the invention.

DETAILED DESCRIPTION OF THE PREFERRED EMBODIMENT

Figure 1:
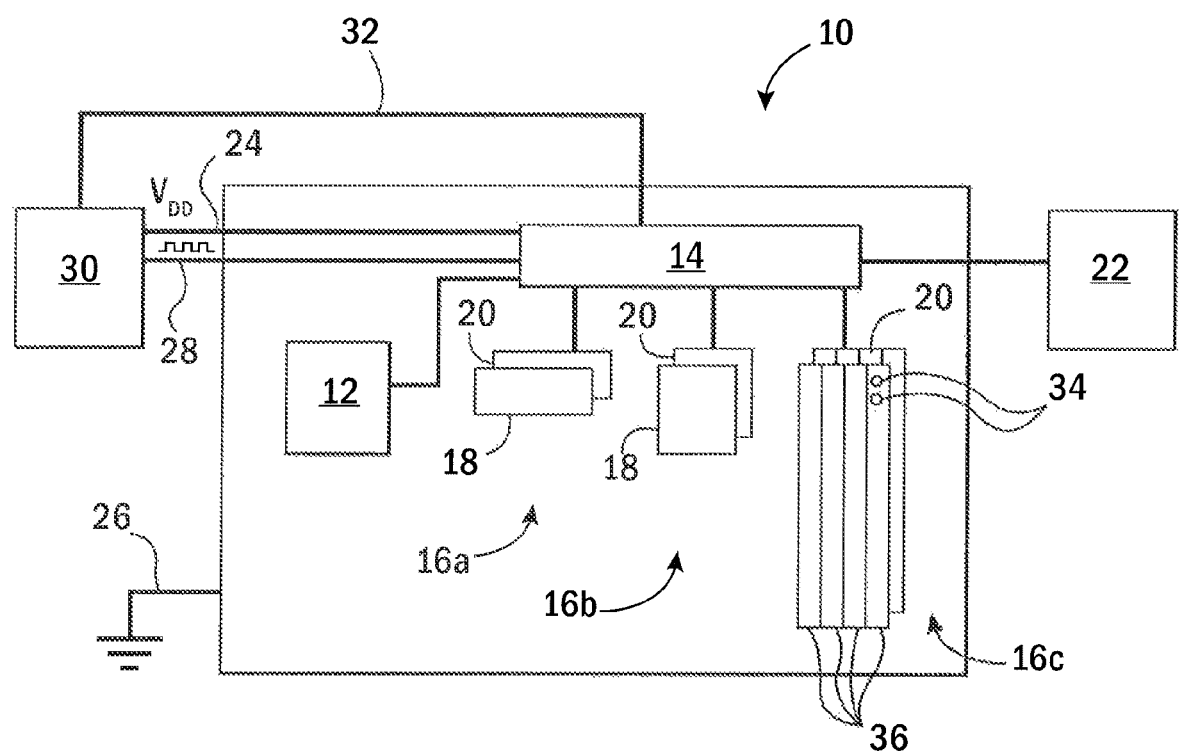
FIG. 1 is a simplified block diagram of a circuit element having a processor, cache controller and multilevel cache structure implementing the present invention.

Referring now to FIG. 1, an integrated circuit element 10, for example, a core of a microprocessor or a freestanding microprocessor, may include a processor element 12 communicating via cache controller 14 with an L1 cache 16a, an L2 cache 16b, and L3 cache 16c.

Each cache 16 may include a data portion 18 and tag portion 20, as is generally understood in the art, and, operating under the control of the cache controller 14, may load data from a main memory 22 together with a tag address identifying the source address of that loaded data in the main memory 22, and may provide that loaded data to the processor element 12 in response to instructions reading the main memory 22 at the particular source address. The caches 16 may further receive modifications of the loaded data from the processor element 12 and may store that data back to the main memory 22 under control of the cache controller 14. In these respects, the cache controller 14 may operate in a conventional manner as is understood in the art.

The integrated circuit element 10 may include input lines for operating voltage 24 and ground 26, these lines together providing power to the circuitry of the integrated circuit element 10. The integrated circuit element 10 may also receive a clock signal 28 permitting synchronous operation of various elements of the integrated circuit element 10 as is understood in the art.

The operating voltage 24 and the clock signal 28 may be provided by a dynamic voltage frequency scaling (DVFS) circuit 30 monitoring operation of the integrated circuit element 10 and possibly other similar elements of a larger integrated circuit, to change the level of the operating voltage 24 and the frequency of the clock signal 28 according to the operating conditions of the integrated circuit 10 and the other similar elements. In particular the DVFS circuit 30 may monitor use of the integrated circuit element 10, for example, with respect to queued instructions or its operating temperature, to raise or lower the operating voltage 24 and the frequency of the clock signal 28 at times when the integrated circuit element 10 is busy or idle or is below or has reached an operating temperature limit. The DVFS circuit 30 may provide for a communication line 32 communicating with the cache controller 14 for indicating changes in the operating voltage 24 or clock signal 28, or the cache controller 14 may receive the operating voltage 24 and clock signal 28 directly and monitor them to deduce changes accordingly.

In the present invention, at least one of the caches 16, and preferably at least the largest cache 16c (typically the last-level cache LLC), may be constructed with a heterogeneous architecture in which memory cells 34 (for example, each storing a single bit in the cache memory) are grouped into multiple ways 36. Because the LLC cache 16 normally has the greatest number of memory cells, the invention provides the greatest impact with this cache, however the invention may also be implemented all caches or different caches.

Each way 36 will thus hold multiple memory cells 34 that may be activated and deactivated as a group by the cache controller 14. The deactivation of a way 36 substantially removes all operating power from the memory cells 34 of that way 36 so that they lose state information (lose stored information) and cease consuming substantial power. When a given way 36 is deactivated, addressing for reading and writing of the remaining memory cells 34 of the ways 36 that have not been deactivated continues to operate as normal Importantly, the grouping of memory cells 34 into ways 36 (defined by the ability to activate or deactivate all memory cells 34 in a way 36 at once) is consistent among different integrated circuit elements 10 to provide deterministic performance behavior for all such integrated circuit elements 10.

Each of the memory cells 34 may be composed of multiple transistors receiving the operating voltage 24 to provide power and biasing to the transistors together with control lines, such as word lines, or bit lines, which are used for transferring data. During normal operation of the memory cells 34 the operating voltage 24 will typically be constant and the word lines and bit lines controlled and read in order to read and write data.

Figure 2:
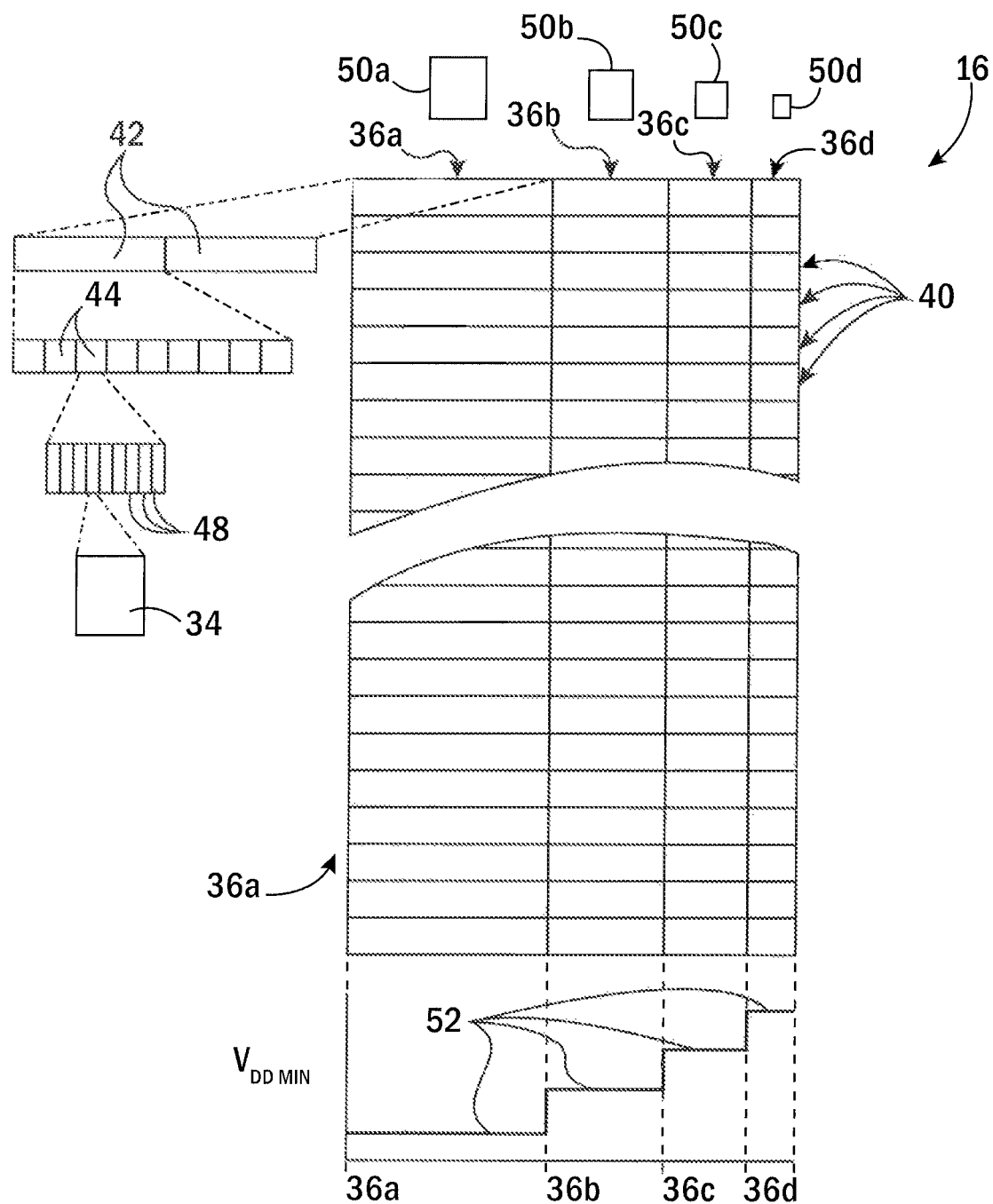
FIG. 2 is a detailed diagram of a last level cache of FIG. 1 divided into portions or ways associated with different minimum operating voltages further showing the hierarchical data structures forming the cache and variations in the area of the transistors forming memory cells four different ways.

Referring now to FIG. 2, an example LLC cache 16c may provide for four different ways 36a-36d shown as columns spanning multiple rows 40 of memory cells 34. Generally each row 40 within each way 36 will provide storage space for multiple cache lines 42. The cache lines may each be composed of multiple computer words 44 which are in turn composed of multiple bits 48. Each bit will comprise one memory cell 34.

The memory cells 34 in each of the different ways 36 will be associated with different circuits using different amounts of integrated circuit area in the integrated circuit element 10. In the example of FIG. 2, the sum 50a of the areas of the transistors associated with each memory cell 34 for way 36a will be larger than a sum 50b of the areas of the transistors associated with each memory cells 34 for way 36b, which in turn will be larger than the sum 50c of the areas of the transistors associated with each memory cell 34 for way 36c, which in turn will be larger than the sum 50d of the areas of the transistors associated with each memory cell 34 for way 36d.

By changing the areas 50 among the ways 36, the minimum operating voltage 52 ($V_{DDMIN}$) of the memory cells 34 of each of the ways 36a-36d may be varied in a predetermined manner to be lowest for memory cells 34 associated with way 36a and successively higher for memory cells 34 associated with successive ways of 36b-36d. This increase in minimum operating voltage $V_{DDMIN}$ results from differences in the areas of the transistors of memory cells 34 where larger areas make them less sensitive to mismatches induced by process variations. As noted above, the minimum operating voltage $V_{DDMIN}$ defines how low the operating voltage 24 can be for the memory cells 34 without loss of state information.

Generally the area of the transistor may be any consistent measurement of transistor geometry and will typically be the overlap between the gate and other transistor components for field effect type transistors.

Figure 3:
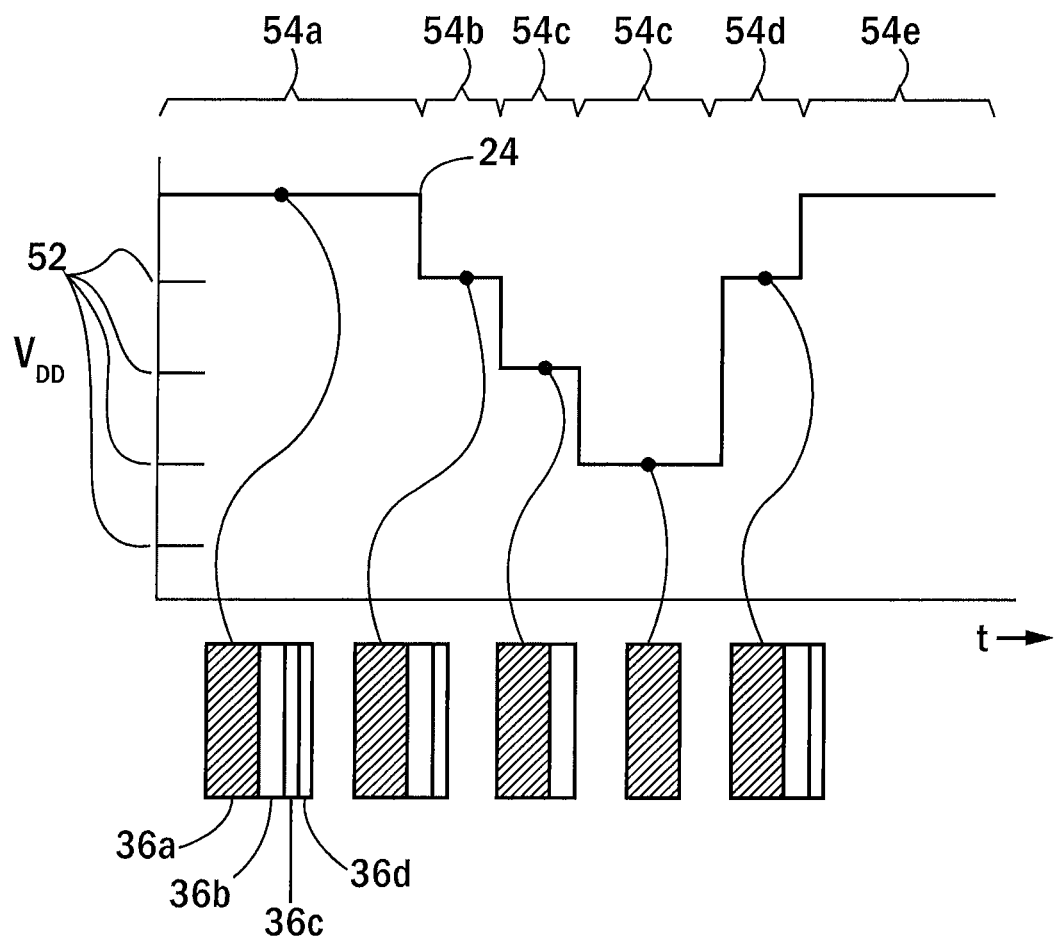
FIG. 3 is a graph of changes in operating voltage showing corresponding changes in cache capacity according to the present invention.

Referring now to FIG. 3, the cache controller 14 may monitor the operating voltage 24 over time to selectively activate and deactivate the different ways 36a-d as a function of the operating voltage 24. Thus, in a first time period 54a where the operating voltage 24 is above the minimum operating voltages 52 for all ways 36a-36d (shown in FIG. 2), all of the ways 36a-36d will be activated for loading and storing of data. As the operating voltage 24 drops progressively below minimum operating voltages 52 for additional individual ways 36 in time periods 54b-54d, those ways 36 whose minimum operative voltage is greater than the current operating voltage 24 will be deactivated starting with way 36d and progressing through way 36b until all but way 36a is deactivated. This process of the activation may be reversed, for example in time periods 54e and 54f as the voltage 24 rises to reactivate individual ways 36.

The present inventors have determined that the performance loss from deactivating ways 36 and thus effectively decreasing the size of the associated cache 16 is substantially offset at lower voltages (where such deactivation will occur) because of lowered frequency of the clock signal 28 of the processor (necessary to match the decreased switching speed of transistors at lower voltages) placing less of a premium on fast access to the main memory 22 and thus permitting a greater number of cache misses with reduced effective penalty for the cache misses.

The use of a heterogeneous cache 16 permits a flexible trade-off between the degree to which the operating voltage 24 may be decreased and loss of performance. The heterogeneous cache 16 even though it employs larger transistors for some ways 36 (e.g. way 36a), may nevertheless reduce total cache area by allowing a reduction in the area of the memory cells 34 for some of the other ways 36 (e.g. way 36d) whose areas would have to be larger if a uniform value $V_{DDMIN}$ were enforced for each way 36. As a result, the cache 16 according to the present invention may be comparable in total area on the integrated circuit element 10 to caches in similar machines having higher minimum voltage.

Figure 4:
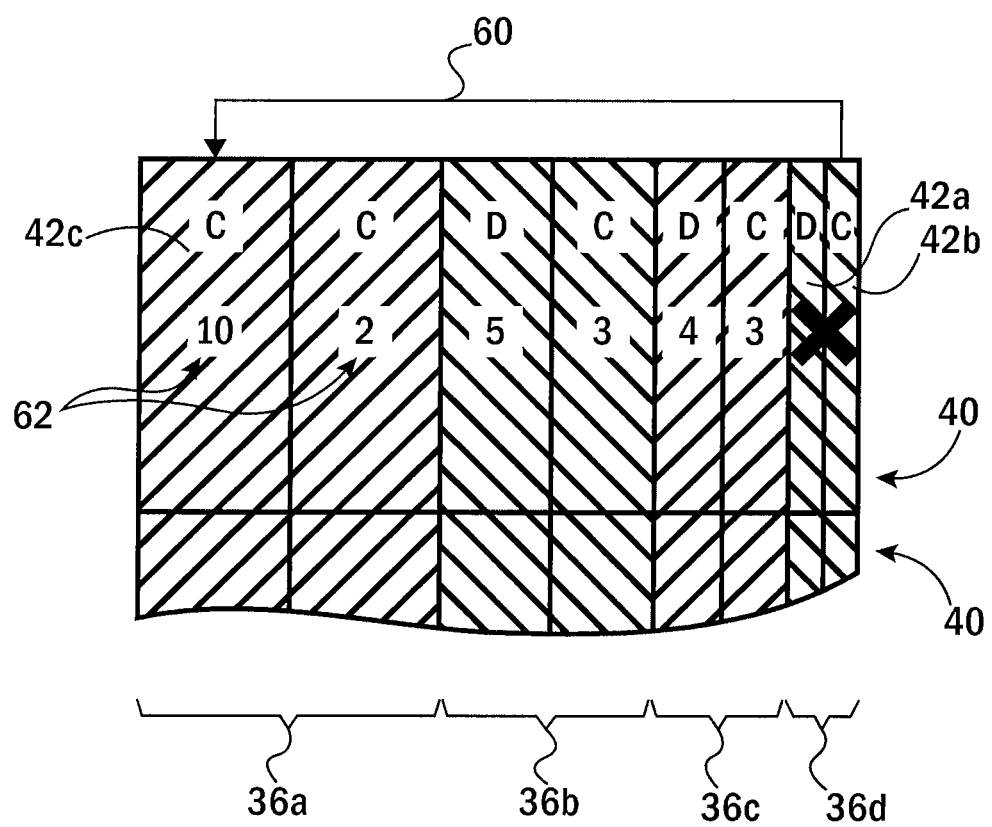
FIG. 4 is a fragmentary diagram of multilevel cache similar to that of FIG. 2 showing intra-cache transfer of dirty cache data.

Referring now to FIG. 4, when the cache controller 14 deactivates a given way 36, for example, indicated by the cross 56 on way 36d, it must evaluate the state of the given cache lines 42a and 42b associated with that way 36d. Cache lines 42b that are "clean" meaning that they have not been modified by the processor element 12 after being loaded from the main memory 22, may be simply deactivated and any state data lost.

Cache lines 42a that are "dirty", meaning that they hold modified data that has been changed by the processor element 12 after having been received from the main memory 22, cannot be deactivated without loss of data that would affect the execution state of the integrated circuit element 10. Accordingly the cache controller 14 must preserve this data.

In a simplest embodiment, the cache controller 14 may write data of dirty cache lines 42a back to main memory 22 using normal cache control techniques.

Alternatively, the dirty cache lines 42a may be transferred via intra-cache transfer 60 to a clean cache line 42c in a different way 36a that is not being deactivated. In one embodiment, the cache controller 14 may select a cache line 42c to receive the data of the dirty cache line 42a according to how recently data was loaded into the cache line 42c from the main memory 22 indicated schematically by numbers 62 associated with each cache line 42. In this example, the cache controller 14 moves the dirty data from cache line 42b (in a way 36d to be deactivated) into the clean cache line 42c associated with a way 36a that is not being deactivated and that currently has the oldest stored data. This approach greatly reduces the power and resources necessary for transfer of data from the deactivated cache lines 42a.

After deactivation or reactivation of a way 36, the cache controller 14 may compensate for the change in the capacity of the cache 16 by changing stored value indicating cache capacity and available cache lines using techniques well understood in the art in current cache controller technology.

Figure 5:
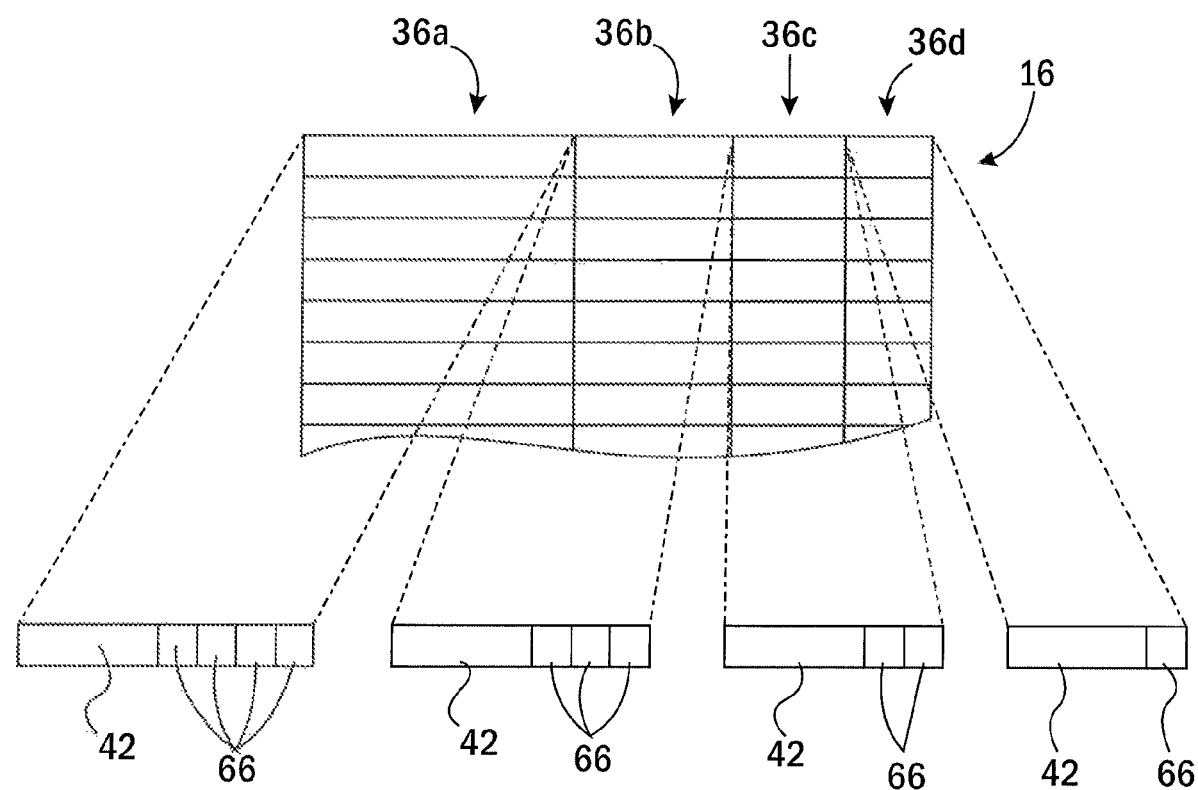
FIG. 5 is a diagram similar to that of FIGS. 2 and 4 showing an alternative cache architecture in which different numbers of error correcting bits are associated with each memory cell of the different ways.

Referring now to FIG. 5, a division of the cache 16 into multiple ways 36 having rankable differences in minimum operating voltages $V_{DDMIN}$ and thus their response to lowering of the operating voltage 24, need not change the physical sizes of the transistors of the memory cells 34 but may instead increase the area of the integrated circuit element 10 devoted to each memory cell 34 by associating additional transistors with a given memory cell 34, wherein the number of additional associated transistors changes according to the particular way 36. Thus, for example, a cache line 42 in way 36a may include memory cells 34 associated with multiple error correcting bits 66 (four shown, in this simplified example) which may serve to correct for errors those memory cells 34 as voltage is reduced providing the corresponding cache line with a lower value of $V_{DDMIN}$. The memory of the error correcting bits 66 and associated circuitry contribute to the effective area of the memory cells 34 according to the area of the error correcting circuitry divided by the number of memory cells 34 for which it provides error correction. The error correcting bits 66 thus effectively increase the area of the integrated circuit element 10 supporting each memory cell to provide greater robustness against low voltage memory loss.

Continuing with this example, cache line 42 for way 36b may be associated with fewer (e.g. three) parity bits and cache line 42 associated with way 36c may be associated with two error correcting bits 66 and cache line 42 associated with way 36d may be associated with one error correcting bit 66. It will be understood that these numbers of bits are shown for explanation only and that the invention is not bound to a particular number of error correcting or detecting bits provided that a difference in the memory cells 34 for different ways 36 in response to lowering voltage 24 may be effected.

Figure 6:
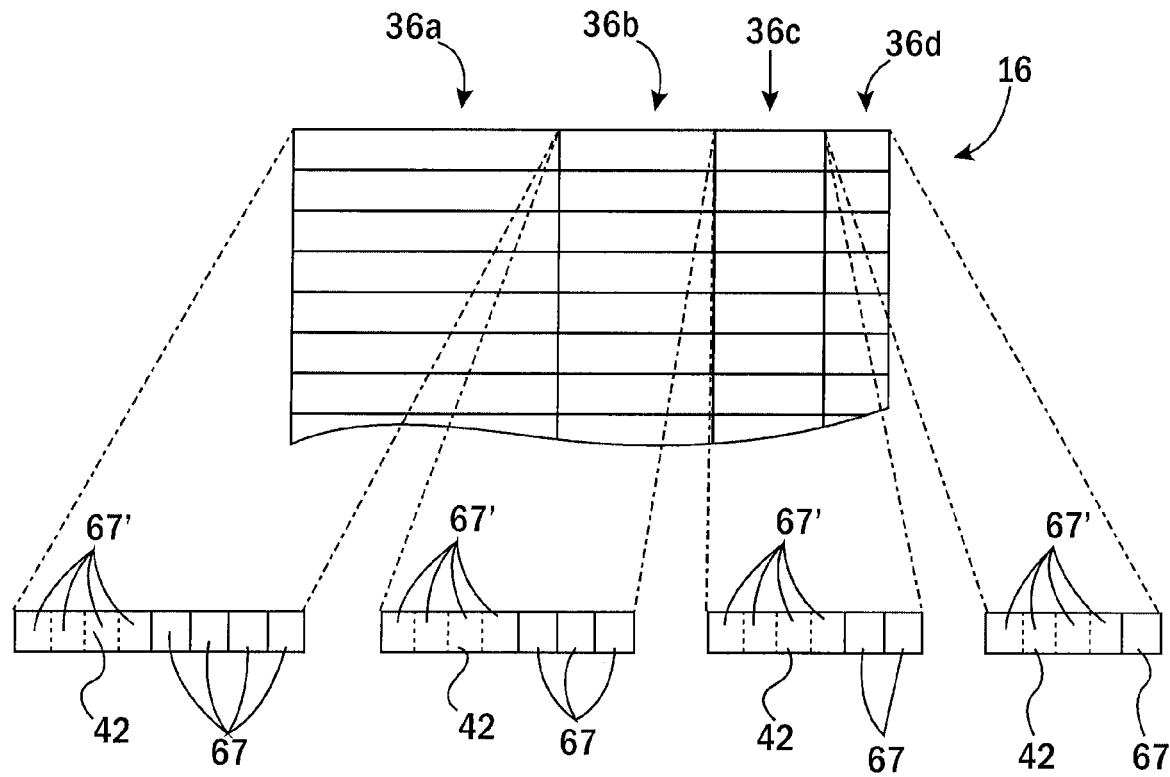
FIG. 6 is a figure similar to that of FIG. 5 showing alternative cache architecture in which different numbers of backup memory cells provided for each memory cell of the different ways.
Figure 7:
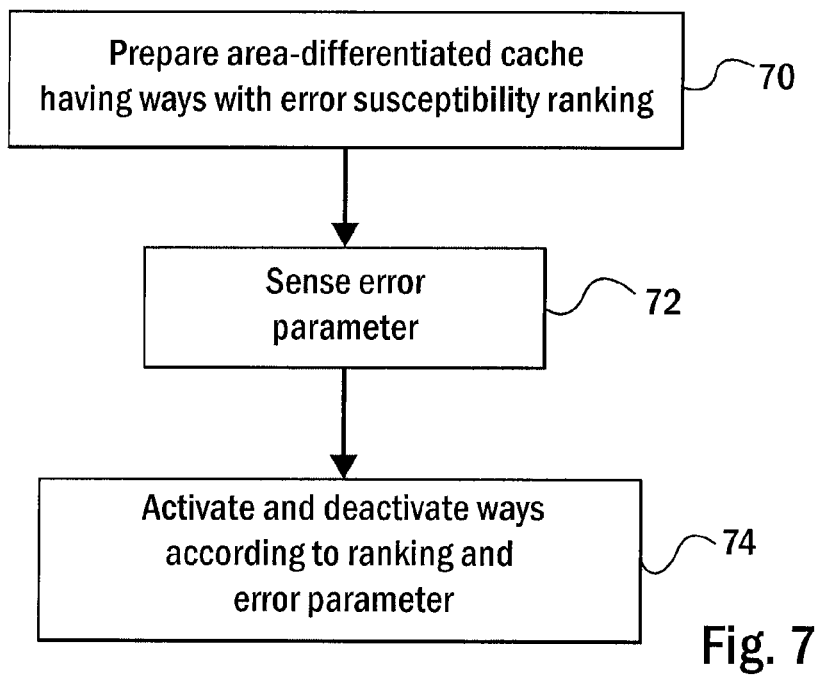
FIG. 7 is a flowchart of a method according to the present invention.

Referring now to FIG. 6, in an alternative embodiment, different numbers of redundant memory components 67 may be associated with the cache lines 42 of each way 36. The redundant memory components 67 may be single bits 48 of the cache line 42 or individual computer words 44 of the cache line 42 or even individual memory cells 34 or transistors of a multi transistor memory cell 34 representing a single bit 48. Importantly, the redundant memory components 67 can be substituted or rewired for corresponding components 67' of the cache line 42 (by setting fuses or the like).

During manufacture, the cache lines 42 of each way 36 are tested to the desired voltage (e.g., lower voltages for way 36a than for way 36d) and components 67' of the tested cache lines 42 that cannot perform at the desired voltage are identified. These underperforming components 67' are then replaced by particular redundant components 67 that have been identified as performing at the desired voltage. Generally, components 67 that will perform at lower relative voltages under normal manufacturing variations will be less common than components 67 that will perform at higher relative voltages. Further, underperforming components 67' will be more common at lower voltages. Accordingly access to more components 67 is provided to the ways 36 that must operate at lower voltages.

Thus, in way 36a, for example, one component 67' may be replaced by any of four other redundant components 67, whereas the components 67' in the ways 36b, 36c, and 36d, may be replaced by only three two and one redundant components 67 respectively. In this case, heterogeneous structure is a result of the associations of different numbers of redundant components 67 with the cache lines 42 of each way 36.

In one embodiment, the redundant components 67 individually may be of equal size in each of the ways 36a-36d and of equal size to the replaced components 67'. In different embodiments, however, the redundant components 67 may be slightly larger or smaller than the components they replace to increase or decrease the chance that they may serve as replacement components for a given voltage. In addition, the area of the individual redundant components 67 may be varied according to the ways 36 in some embodiments. In one embodiment, the redundant components 67 may be selected by any of the ways 36 from a common pool shared by all of the ways 36. The redundant components 67 may then be characterized with respect to voltage and those operating at the lowest voltage levels allocated as needed to the ways 36 operating at the lowest voltage.

The present invention, in each of these embodiments, follows a methodology that begins with the preparation of area differentiated cache structures with error susceptibility ranking of the different portions of the area differentiated cache structure as indicated by process block 70. This cache structure may be produced by any of the techniques described with respect to FIGS. 2, and 6 in which each way 36 is associated with a minimum operating voltage threshold $V_{DDMIN}$ of the operating voltage 24. Different portions of the cache structure having different rankings may be individually activated or deactivated, for example, using a common control line for the portion.

At process block 72, an error parameter is sensed, for example the value of the operating voltage 24, the frequency of the clock signal 28, temperature, detected errors or other proxies for reduced voltage which will be used to control the activation and deactivation of the portions of the cache structure.

At process block 74, based on the sensed error parameter, different ways 36 may be switched in or out of the cache 16 according to the ranking and based on the sensed error parameter.

While the above described embodiments contemplates that multiple memory cells 34 may be activated and deactivated by the cache controller 14 as a group defined by ways 36 which are represented by columns, it will be understood that the cache controller 14 may alternatively activate and deactivate memory cells 34 according to rows. As before, deactivation of a row substantially removes all operating power from the memory cells 34 of that way 36 so that they lose state information (lose stored information) and cease consuming substantial power.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" should be understood to include not only a stand-alone processor, but a processing core that may be one portion of a multicore processor. The term "processor" should be flexibly interpreted to include a central processing unit and a cache structure or the central processing unit alone as context will require. Furthermore, references to memory, unless otherwise specified, can include one or more processor-readable and accessible memory elements and/or components that can be internal to the processor-controlled device, external to the processor-controlled device, and can be accessed via a wired or wireless network.

The depiction of the circuit elements, for example, the caches, should be understood to be a schematic and representing the logical construction of the elements rather than their physical layout.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A cache system comprising a series of addressable transistor memory cells holding digital data when powered by an operating voltage, wherein
the addressable transistor memory cells are grouped into at least two portions that may be independently deactivated,
wherein the portions provide different architectures having different predetermined susceptibility to errors as a function of operating voltage whereby individual portions may be deactivated or activated with changes in operating voltage according to the predetermined susceptibility to errors as a function of operating voltage; and
wherein portions having a lower predetermined susceptibility to errors as a function of operating voltage provide a greater number of error handling bits than portions having a higher predetermined susceptibility to errors as a function of operating voltage.

2. The cache system of claim 1 wherein the addressable transistor memory cells are grouped into at least three portions that may be independently deactivated and wherein each portion has a different minimum operating voltage.

3. The cache system of claim 1 wherein the transistor memory cells of the different portions differ according to area of an integrated circuit associated with transistors of each memory cell.

4. The cache system of claim 3 wherein corresponding individual transistors of the memory cells of different portions have different sizes of transistor area.

5. The cache system of claim 1 wherein the error handling bits are error correcting bits.

6. The cache system of claim 1 wherein the error handling bits are backup memory bits.

7. The cache system of claim 1 wherein the memory cells are static random access memory cells.

8. The cache system of claim 1 wherein the error handling bits are parity bits.

9. An integrated circuit adapted to communicate with a mail memory and comprising:
a processor;
a cache memory providing multiple independently controlled groups of memory cells, wherein the groups of memory cells have predetermined differing susceptibility to errors as a function of reduction in operating voltage, and wherein groups of memory cells having a lower predetermined susceptibility to errors as a function of reduction in operating voltage provide a greater number of error handling bits than groups of memory cells having a higher predetermined susceptibility to errors as a function of reduction in, operating voltage; and
a cache controller communicating with the cache memory to:
(a) monitor an operating state of the integrated circuit to deduce an operating voltage; and
(b) selectively activate and deactivate groups of memory cells as a function of operating voltage according to the predetermined differing susceptibility to errors as a function of reduction in operating voltage.

10. The integrated circuit of claim 9 wherein the cache controller further operates to identify dirty cache lines in groups of memory cells to be deactivated and to move data of these cache lines into main memory.

11. The integrated circuit of claim 9 wherein the cache controller further operates to identify dirty cache lines in groups of memory cells to be deactivated and to move data of these cache lines into clean cache lines of groups of memory cells.

12. The integrated circuit of claim 11 wherein the cache controller moves the data of the cache lines into the clean cache lines of a group of memory cells that have been least recently accessed.

13. The integrated circuit of claim 9 wherein the memory cells of the groups differ according to area of the integrated circuit associated with transistors of each memory cell with the groups having a greater area being less susceptible to errors as operating voltage decreases than memory cells of groups having lesser area.

14. The integrated circuit of claim 13 wherein corresponding individual transistors of the memory cells of different groups have different transistor areas.

15. The integrated circuit of claim 9 wherein the error handling bits are error correcting bits.

16. The integrated circuit of claim 9 wherein the error handling bits are backup memory bits.

17. The integrated circuit of claim 9 wherein the addressable memory cells are grouped into at least three groups of memory cells that may be independently deactivated and wherein each group of memory cells has a different minimum operating voltage.

18. The integrated circuit of claim 9 wherein the cache memory is a last level cache having a largest capacity of all caches associated with the cache controller.

19. The integrated circuit of claim 9 wherein the memory cells are static random access memory cells.

20. A method of memory management in an integrated circuit of the type including a processor and a cache memory providing multiple independently controlled groups of memory cells, wherein the groups of memory cells have predetermined differing susceptibility to errors as a function of reduction in operating voltage, the method comprising the steps of:
(a) monitoring an operating state of the integrated circuit to deduce an operating voltage; and
(b) selectively activating and deactivating groups of memory cells as a function of operating voltage according to the predetermined differing susceptibility to errors as a function of reduction in operating voltage of the groups;
wherein groups of memory cells having a lower predetermined susceptibility to errors as a function of reduction in operating voltage provide a greater number of error handling bits than groups of memory cells having a higher predetermined susceptibility to errors as a function of reduction in operating voltage.

* * * * *